United States Patent [19]
Deering et al.

[11] Patent Number: 5,914,724
[45] Date of Patent: Jun. 22, 1999

[54] LIGHTING UNIT FOR A THREE-DIMENSIONAL GRAPHICS ACCELERATOR WITH IMPROVED HANDLING OF INCOMING COLOR VALUES

[75] Inventors: Michael Deering, Los Altos; Wayne Morse, Fremont; Scott R. Nelson, Pleasanton; Kevin Rushforth, San Jose, all of Calif.

[73] Assignee: Sun Microsystems, Inc, Palo Alto, Calif.

[21] Appl. No.: 08/884,688

[22] Filed: Jun. 30, 1997

[51] Int. Cl.$^6$ .................................................. G06F 15/00
[52] U.S. Cl. ........................................... 345/431; 345/426
[58] Field of Search ...................................... 345/426, 431

[56] References Cited

U.S. PATENT DOCUMENTS

| | | | |
|---|---|---|---|
| 5,704,025 | 12/1997 | Berry | 345/431 |
| 5,777,620 | 7/1998 | Billyard | 345/426 |

*Primary Examiner*—Mark K. Zimmerman
*Assistant Examiner*—Chante' Harrison
*Attorney, Agent, or Firm*—Jeffrey C. Hood; Dean M. Munyon; Conley, Rose & Tayon

[57] ABSTRACT

A lighting unit which exhibits improved handling of incoming color values corresponding to a polygon. The lighting unit includes an input buffer for storing a plurality of color values, a mode register including a color mode field specifying whether the plurality of color values corresponds to the front or back side of the polygon. Furthermore, the lighting unit includes a register file for storing color information. The register file includes a first and second plurality of registers for storing front and back side color information, respectively. Still further, the lighting unit includes input/output logic configured to perform a transfer color instruction, which first comprises accessing the mode register to obtain a value of the color mode field, and then transferring the plurality of color values from the input buffer to one or more registers within the register file. The one or more registers are located within the first plurality of registers if the value of the color mode field indicates that the plurality of color values correspond to front side color information, and are located within the second plurality of registers if the value of the color mode field indicates back side color information. The one or more registers are located within the first and second plurality of registers if the value of the color mode field indicates both front and back side color information. Finally, the lighting unit includes a lighting computation unit configured to determine a face direction of the polygon. The lighting unit is further configured to use one or more of the plurality of color values (selected in accordance with the face direction) to perform lighting calculations for the polygon.

26 Claims, 10 Drawing Sheets

Computer

LIGHTING UNIT FOR A THREE-DIMENSIONAL GRAPHICS ACCELERATOR WITH IMPROVED HANDLING OF INCOMING COLOR VALUES

FIELD OF THE INVENTION

The present invention relates to a 3-D graphics accelerator, and more particularly to a lighting unit for a 3-D graphics accelerator which exhibits improved performance for handling of incoming color values.

DESCRIPTION OF THE RELATED ART

A three dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three dimensional geometry data that defines three dimensional graphics elements for output on a display device. The application program causes the host processor to transfer the geometry data to the graphics accelerator. The graphics accelerator receives the geometry data and renders the corresponding graphics elements on the display device.

The design architecture of a high performance three dimensional graphics system historically embodies a balance between increasing system performance and minimizing system cost. However, prior graphics systems usually suffer from either limited performance or high cost due to a variety of system constraints.

Applications which display three dimensional graphics require a tremendous amount of processing capabilities. For example, for a computer system to generate smooth 3-D motion video, the computer system is required to maintain a frame rate or update rate of between 20 to 30 frames per second. This requires a 3-D computer graphics accelerator capable of processing over a million triangles per second.

One architectural approach to increasing performance of 3-D graphics systems is through the use of algorithm specific circuits, dedicated to just one stage of a graphics pipeline. This trend started many years ago at the bottom end of the graphics pipeline with pixel processing functions, and gradually moved up to span interpolation, edge interpolation, and more recently, setup functions. Other functions performed earlier in the pipeline (such as transformation, clipping, and lighting) have generally been performed by more expensive general purpose floating-point processors, such as DSP chips or special microcoded floating-point hardware.

Increasingly, however, operations such as lighting are beginning to dominate computation time, particularly with the use of more complex lighting models. In order to achieve greater visual realism, users of graphics languages such as XGL and OpenGL routinely use multiple light sources with specular highlights, not just a single diffuse light. Such requirements place a premium on achieving higher performance within lighting units.

Lighting calculations are typically performed on geometric primitives after such operations as transformation, clip testing, and face determination. These calculations utilize input color values, transformed positional data, light source attributes, and optional normal data in order to generate output color values. The output color values, along with the transformed primitive, are conveyed to subsequent stages of the graphics pipeline for rendering.

Standard graphics languages support a variety of color modes for geometric primitives. For example, a global color may be defined for the front surface of a given object, and likewise for a back surface. Certain polygons comprising the surface, however, may have input colors specified on a per-vertex basis (for one or both surfaces), thereby overriding the global color setting. A mode setting may also indicate that the colors are only to be used for the calculation of the one type of light component for the primitive (for example, only the specular component). An alpha component, used for transparency blending calculations, may additionally be specified for the front and back surfaces. The overhead necessitated by the number of color modes which must be supported for graphics standards is a major bottleneck to increased performance in prior art lighting units.

Because of such complications, the transfer of color data into the lighting unit (and subsequent color selection during lighting operations) is typically quite complex. This complexity typically necessitates a large number of microcode routines to handle all possible types of incoming data. This leads to increased storage for microcode instructions, as well as inefficient execution of the microcode routines themselves, as it is difficult to optimize performance for a large number of routines.

A lighting unit is therefore desired which provides increased performance for handling of incoming color values.

SUMMARY OF THE INVENTION

The present invention comprises a graphics accelerator for performing lighting operations to render a 3-D object comprising one or more polygons including front and back sides. In one embodiment, a graphics accelerator is provided which exhibits improved handling of incoming color values to a lighting unit. The graphics accelerator comprises a lighting unit configured to perform lighting calculations on the polygon. The lighting unit includes an input buffer for storing a plurality of color values, a mode register including a color mode field specifying whether the plurality of color values corresponds to the front or back side of the polygon. The mode register further includes a face direction field specifying whether the lighting operations are to be performed according to the front side or the back side of the polygon. Furthermore, the lighting unit includes a register file for storing color information. The register file includes a first plurality of registers for storing front side color information and a second plurality of registers for storing back side color information. Still further, the lighting unit includes input/output logic configured to perform a transfer color instruction.

Execution of the transfer color instruction comprises accessing the mode register to obtain a value of the color mode field, and then transferring the plurality of color values from the input buffer to one or more registers within the register file. The one or more registers are located within the first plurality of registers if the value of the color mode field indicates that the plurality of color values correspond to front side color information. Conversely, the one or more registers are located within the second plurality of registers if the value of the color mode field indicates that the plurality of color values correspond to back side color information. The one or more registers are located within the first plurality of registers and the second plurality of registers if the value of the color mode field indicates that the plurality of color values correspond to both front and back side color information. Finally, the lighting unit includes a lighting computation unit configured to access the mode register to obtain a value of the face direction field. The lighting unit is further configured to perform lighting calculations utilizing one or more of the plurality of color values selected in accordance with the value of the face direction field.

By using the mode register to effectuate the transfer color instruction and lighting operations, one microcode routine can be utilized for handling of front and back material colors. Microcode storage may thus be reduced, and lighting performance may be increased by optimizing for the single routine.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Figure 1:
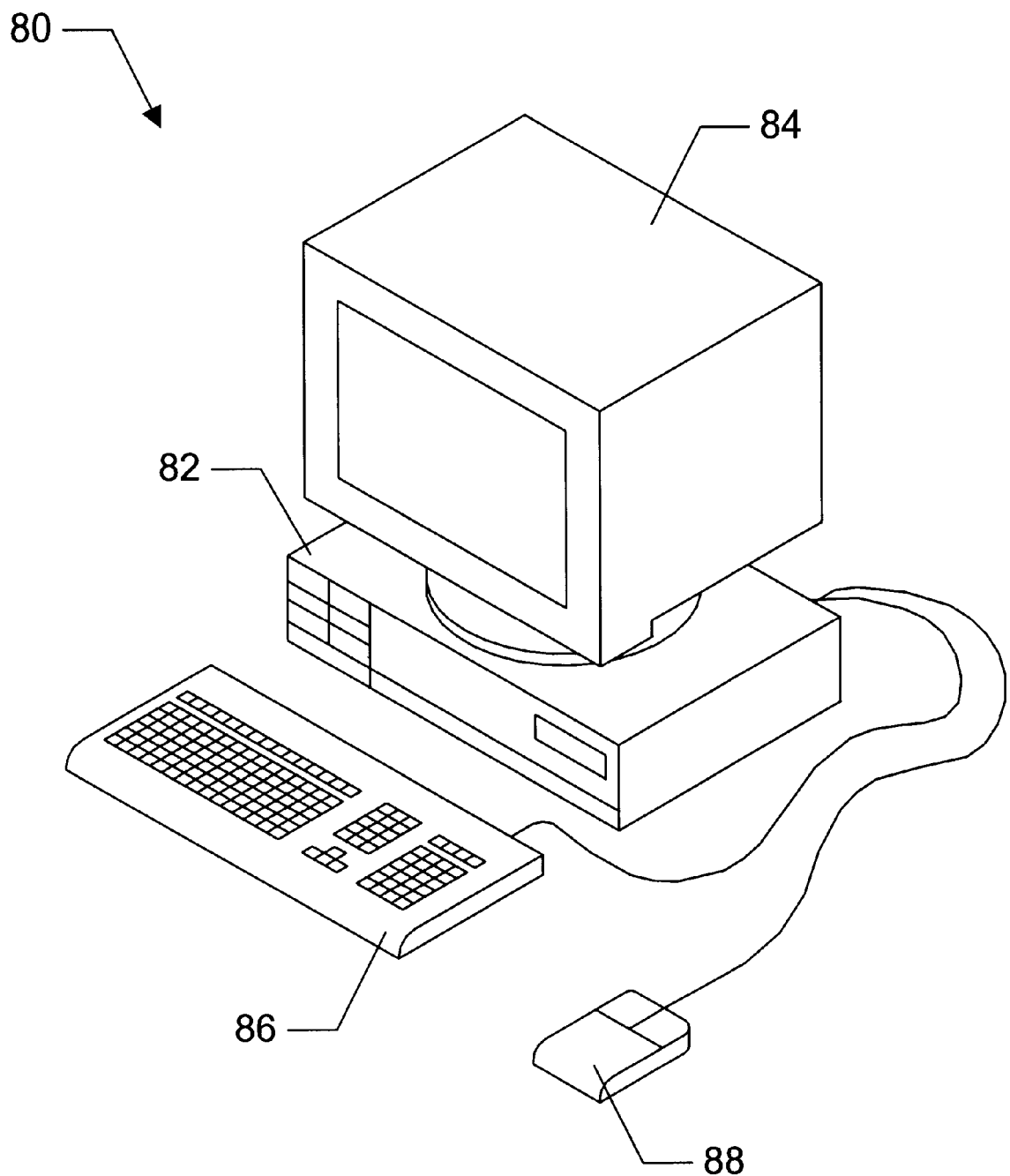
FIG. 1 illustrates a computer system which includes a three dimensional (3-D) graphics accelerator according to the present invention.

FIG. 1—Computer System

Referring now to FIG. 1, a computer system 80 which includes a three-dimensional (3-D) graphics accelerator according to the present invention is shown. As shown, the computer system 80 comprises a system unit 82 and a video monitor or display device 84 coupled to the system unit 82. The display device 84 may be any of various types of display monitors or devices. Various input devices may be connected to the computer system, including a keyboard 86 and/or a mouse 88, or other input. Application software may be executed by the computer system 80 to display 3-D graphical objects on the video monitor 84. As described further below, the 3-D graphics accelerator in computer system 80 includes a lighting unit which exhibits increased performance for handling of incoming color values of polygons used to render three-dimensional graphical objects on display device 84.

Figure 2:
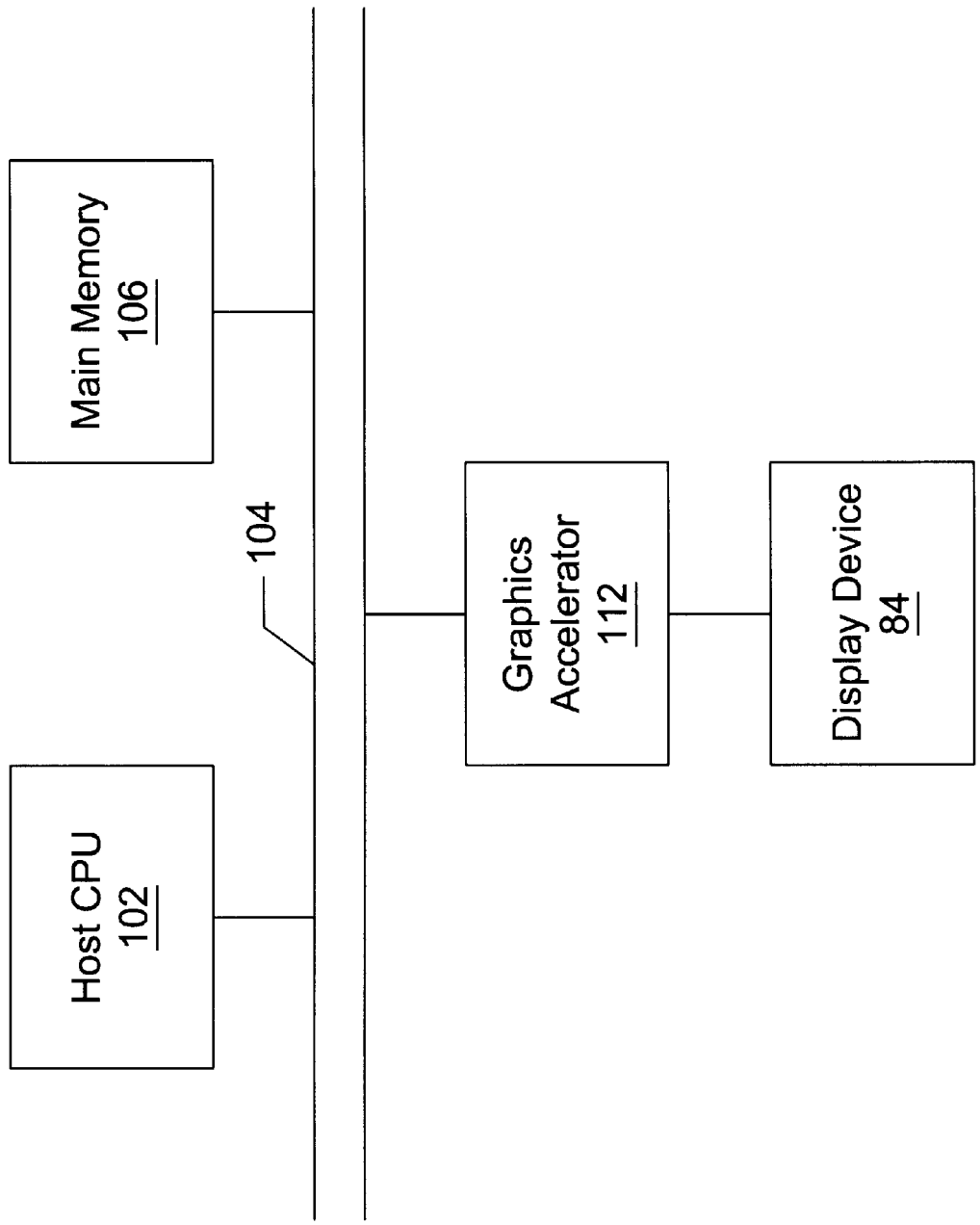
FIG. 2 is a simplified block diagram of the computer system of FIG. 1.

FIG. 2—Computer System Block Diagram

Referring now to FIG. 2, a simplified block diagram illustrating the computer system of FIG. 1 is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. It is noted that the 3-D graphics accelerator may be coupled to any of various buses, as desired. As shown, the video monitor or display device 84 connects to the 3-D graphics accelerator 112.

The host processor 102 may transfer information to and from the graphics accelerator 112 according to a programmed input/output (I/O) protocol over the host bus 104. Alternately, the graphics accelerator 112 accesses the memory subsystem 106 according to a direct memory access (DMA) protocol or through intelligent bus mastering.

A graphics application program conforming to an application programmer interface (API) such as OpenGL generates commands and data that define a geometric primitive such as a polygon for output on display device 84. As defined by the particular graphics interface used, these primitives may have separate color properties for the front and back surfaces. Host processor 102 transfers these commands and data to memory subsystem 106. Thereafter, the host processor 102 operates to transfer the data to the graphics accelerator 112 over the host bus 104. Alternatively, the graphics accelerator 112 reads in geometry data arrays using DMA access cycles over the host bus 104. In another embodiment, the graphics accelerator 112 is coupled to the system memory 106 through a direct port, such as the Advanced Graphics Port (AGP) promulgated by Intel Corporation. As will be described below, graphics accelerator 112 is advantageously configured to allow more efficient microcode control, which results in increased performance for handling of incoming color values corresponding to the polygons generated by host processor 102.

Figure 3:
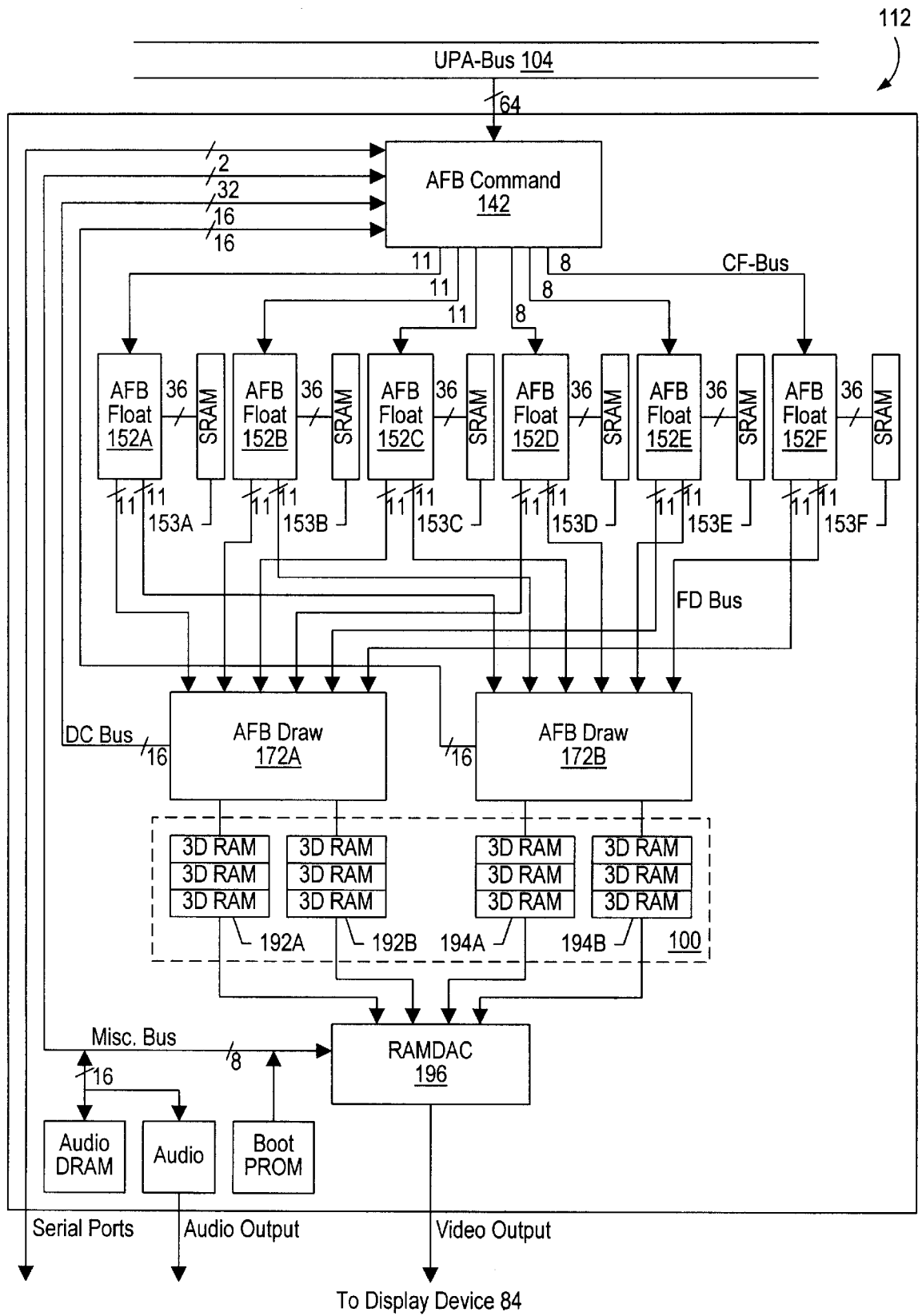
FIG. 3 is a block diagram illustrating the 3-D graphics accelerator according to the preferred embodiment of the present invention.

FIG. 3—Graphics Accelerator

Referring now to FIG. 3, a block diagram is shown illustrating the graphics accelerator 112 according to the preferred embodiment of the present invention. As shown, the graphics accelerator 112 is principally comprised of a command block 142, a set of floating-point processors 152A–152F, a set of draw processors 172A and 172B, a frame buffer 100 comprised of 3DRAM, and a random access memory/digital-to-analog converter (RAMDAC) 196.

As shown, the graphics accelerator 112 includes command block 142 which interfaces to the memory bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression.

The command block 142 interfaces to a plurality of floating point blocks 152. The graphics accelerator 112 preferably includes up to six floating point processors labeled 152A–152F, as shown. The floating point processors 152A–152F receive high level drawing commands and generate graphics primitives, such as triangles, lines, etc. for rendering three-dimensional objects on the screen. The floating point processors 152A–152F perform transformation, clipping, face determination, lighting and set-up operations on received geometry data. Each of the floating point processors 152A–152F connects to a respective memory 153A–153F. The memories 153A–153F are preferably 32 k×36-bit SRAM and are used for microcode and data storage.

Each of the floating point blocks 152A–F connects to each of two draw processors 172A and 172B. The graphics accelerator 112 preferably includes two draw processors 172A and 172B, although a greater or lesser number may be used. The draw processors 172A and 172B perform screen space rendering of the various graphics primitives and operate to sequence or fill the completed pixels into the 3DRAM array. The draw processors 172A and 172B also function as 3DRAM control chips for the frame buffer 100. The draw processors 172A and 172B concurrently render an image into the frame buffer 100 according to a draw packet received from one of the floating-point processors 152A–152F, or according to a direct port packet received from the command processor 142.

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both parts of the FD-bus to the draw processors 172A and 172B.

Each of the respective drawing blocks 172A and 172B couple to frame buffer 100, wherein frame buffer 100 comprises four banks of 3DRAM memory 192A–B, and 194A–B. The draw processor 172A couples to the two 3DRAM banks 192A and 192B, and the draw processor 172B couples to the two 3DRAM banks 194A and 194B, respectively. Each bank comprises three 3DRAM chips, as shown. The 3DRAM memories or banks 192A–B and 194A–B collectively form the frame buffer 100, which is 1280×1024 by 96 bits deep. The frame buffer stores pixels corresponding to 3-D objects which are rendered by the draw processors 172A and 172B.

Each of the 3DRAM memories 192A–B and 194A–B couple to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The command block is preferably implemented as a single chip. Each of the floating point processors 152 are preferably implemented as separate chips. In the preferred embodiment, up to six floating point blocks or chips 152A–F may be included. Each of the drawing blocks or processors 172A and 172B also preferably comprise separate chips. For more information on different aspects of the graphics accelerator architecture of the preferred embodiment, please see related co-pending application Ser. No. 08/673,492 entitled "Three-Dimensional Graphics Accelerator With Direct Data Channels for Improved Performance", and related co-pending application Ser. No. 08/673,491 entitled "Three-Dimensional Graphics Accelerator Which Implements Multiple Logical Buses Using Common Data Lines for Improved Bus Communication", both filed on Jul. 1, 1996.

As described above, command block 142 interfaces with host bus 104 to receive graphics commands and data from host CPU 102. These commands and data (including polygons with both front and back surface properties) are passed in turn to floating point processors 152 for transformation, lighting, and setup calculations. The general operation of these floating point processors 152, which are advantageously configured for improved handling of incoming color values, is described with reference to FIG. 4. The L-core block within floating point processors 152, which provides this improved handling capability, is described more specifically with reference to FIGS. 5–8.

Figure 4:
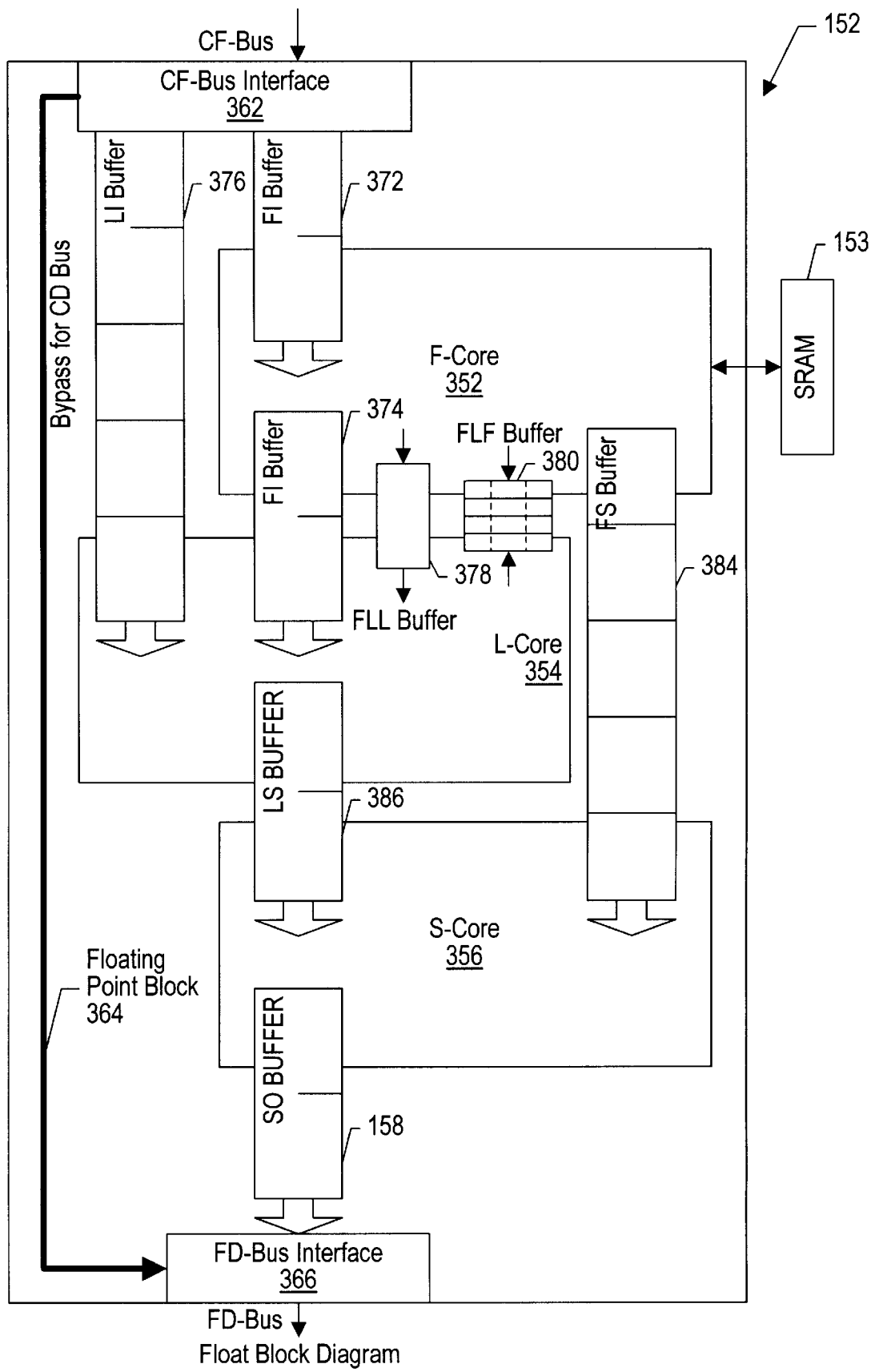
FIG. 4 is a block diagram illustrating one of the floating point processors in the 3-D graphics accelerator according to the preferred embodiment of the present invention.

FIG. 4—Floating Point Processor Block Diagram

Referring now to FIG. 4, a block diagram illustrating one of the floating point processors 152 according to the preferred embodiment of the present invention is shown. Each of the respective floating point processors 152A–152F are identical, and thus only one is described here for convenience. As shown, each of the floating point blocks 152 includes three main functional units or core processors, these being F-core 352, L-core 354, and S-core 356. The F-core block 352 is coupled to receive data from the CF-bus transferred from the Command block 142. The F-core block 352 provides output data to each of the L-core block 354 and the S-core block 356. The L-core block 354 also provides data to the S-core block 356. The S-core block 356 provides output data to the FD bus.

The F-core block 352 performs all floating point intensive operations, including geometry transformation, clip testing, face determination, perspective division, and screen space conversion. The F-core block 352 also performs clipping when required. In the preferred embodiment, the F-core block 352 is fully programmable, using a 36-bit micro instruction word stored in a 32 k word SRAM.

The L-core block 354 performs most lighting calculations using on-chip RAM-based microcode. The L-core block 354 block also includes an efficient triple-word design for more efficient lighting calculations. This triple-word design operates with a 48-bit data word comprising 16-bit fixed point values. Thus one instruction can perform the same function on all three color components (RGB) or all three components of a normal ($N_x$, $N_y$, and $N_z$) in one cycle. The math units comprised in the L-core block 354 automatically clamp values to the allowed ranges, thus requiring no additional branches.

The S-core block performs setup calculations for all primitives. These set-up calculations involve computing the distances in multiple dimensions from one vertex to another and calculating slopes along that edge. For triangles, the slopes of the Z depth, the color, and the UV (for texture) are also computed in the direction of a scan line.

As shown, each of the floating point blocks 152 includes CF-bus interface logic 362 which couples to the CF-bus. Each of the floating point blocks 152 includes FD-bus interface logic 366 which couples to the FD-bus. Each floating point block 152 includes a bypass bus or data path 364 which serves as the data transfer path through a respective floating point block 152 for the CD bus. Data which is sent over the CD bus, i.e., which is sent directly to the FD bus, travels on the data transfer bus 364, thus bypassing the floating point logic comprised in the floating point block 152.

In general, data which is provided to the floating point block 152 can have one of three destinations, these being the F-core block 352, the L-core block 354, or directly out to the FD bus, i.e., a CD bus transfer. In the preferred embodiment, data which is destined for the F-core block 352 comprises 32-bit words, including 32-bit IEEE floating point numbers and other 32-bit data. Data destined for the L-core block 354 comprises 48-bit words comprising three 16-bit fixed point numbers.

As shown, the floating point block 152 includes a float input buffer (FI buffer) 372 which receives data from the CF-bus which was provided by the command block 142. The FI buffer 372 is double-buffered and holds 32 32-bit entries in each buffer. The first word, word zero, stored in the FI buffer 372 comprises an opcode which informs the F-core block 352 which microcode routine to dispatch for the received geometric primitives. Only the header and X, Y and Z coordinates are provided to this buffer when transforming and lighting geometric primitives.

The floating point block 152 also includes an F-core to L-core buffer (FL buffer) 374. The FL buffer 374 is double buffered and holds 16 16-bit entries in each buffer. The F-core block 352 operates to write or combine three F-core words into one L-core word which is provided to the FL buffer 374. From the L-core perspective, each buffer in the FL buffer 374 appears as five 48-bit entries. During lighting operations, three X, Y, Z coordinates are sent from the F-core block 352 through the FL buffer 374 to the L-core block 354. These three X, Y, Z coordinates are used to compute eye direction.

The floating point block 152 includes an L-core input buffer (LI buffer) 376 which receives data sent across the CF-bus which was provided from the command block 142 and provides this data to the L-core block 354. The LI buffer 376 comprises five buffers, each of which hold seven 48-bit entries. These seven 48-bit entries comprise three vertex normals, three vertex colors and one word with three alpha values. The FI buffer 372 and the LI buffer 376 collectively comprise the floating point block input buffer.

The floating point block 152 also includes an FLL buffer 378, which connects between the F-core block 352 and the L-core block 354. The FLL buffer 378 is a FIFO used for transmitting lighting and attenuation factors from the F-core block 352 to the L-core block 354. These attenuation factors comprise three X,Y,Z position values, three attenuation values, three ambient light values, and one attenuation shift word containing three packed values. An FLF buffer 380 is also provided between the F-core block 352 and the L-core block 354. The FLF buffer is a bi-directional buffer used for communicating data between the F-core block 352 and the L-core block 354 under F-core control.

An L-core to S-core buffer (LS buffer) 386 is coupled between the L-core block 354 and the S-core block 356. The LS buffer 386 is double-buffered with each buffer holding four 48-bit words.

The floating point block 152 also includes an F-core to S-core buffer (FS buffer) 384 which is used for transferring data from the F-core block 352 to the S-core block 356. The FS buffer comprises five buffers which each hold 32 32-bit values. These five buffers are designed to match the pipeline stages of the L-core block 354, these being the two FL buffers, the two LS buffers, plus one primitive which may be stored in the L-core block 354. Data transferred from the F-core block 352 through this buffer to the S-core block 356 includes a dispatch code that indicates which microcode procedure to run in the S-core block 356.

Finally, the floating point block 152 includes an S-core output buffer (SO buffer) 158 which is coupled between the S-core block 356 and the FD bus interface 366. The SO buffer 158 collects data to be sent across the FD bus to the respective draw processors 172A–172B. The SO buffer 158 is double buffered and holds 32 32-bit words in each buffer. The SO buffer 158 holds up to two primitives comprising fixed point data in the order needed by the respective draw processors 172A–172B. S-core block 356 conveys additional status information along with the fixed point data to draw processors 172. For example, a status bit is conveyed with each entry indicating whether or not a given primitive is the last of a group of related primitives. The SO buffer 158 includes a separate status register which indicates how many words are valid so that the minimum number of cycles are used to transfer the data across the bus. The SO buffer 158 comprises the floating point block output buffer 158.

Figure 5:
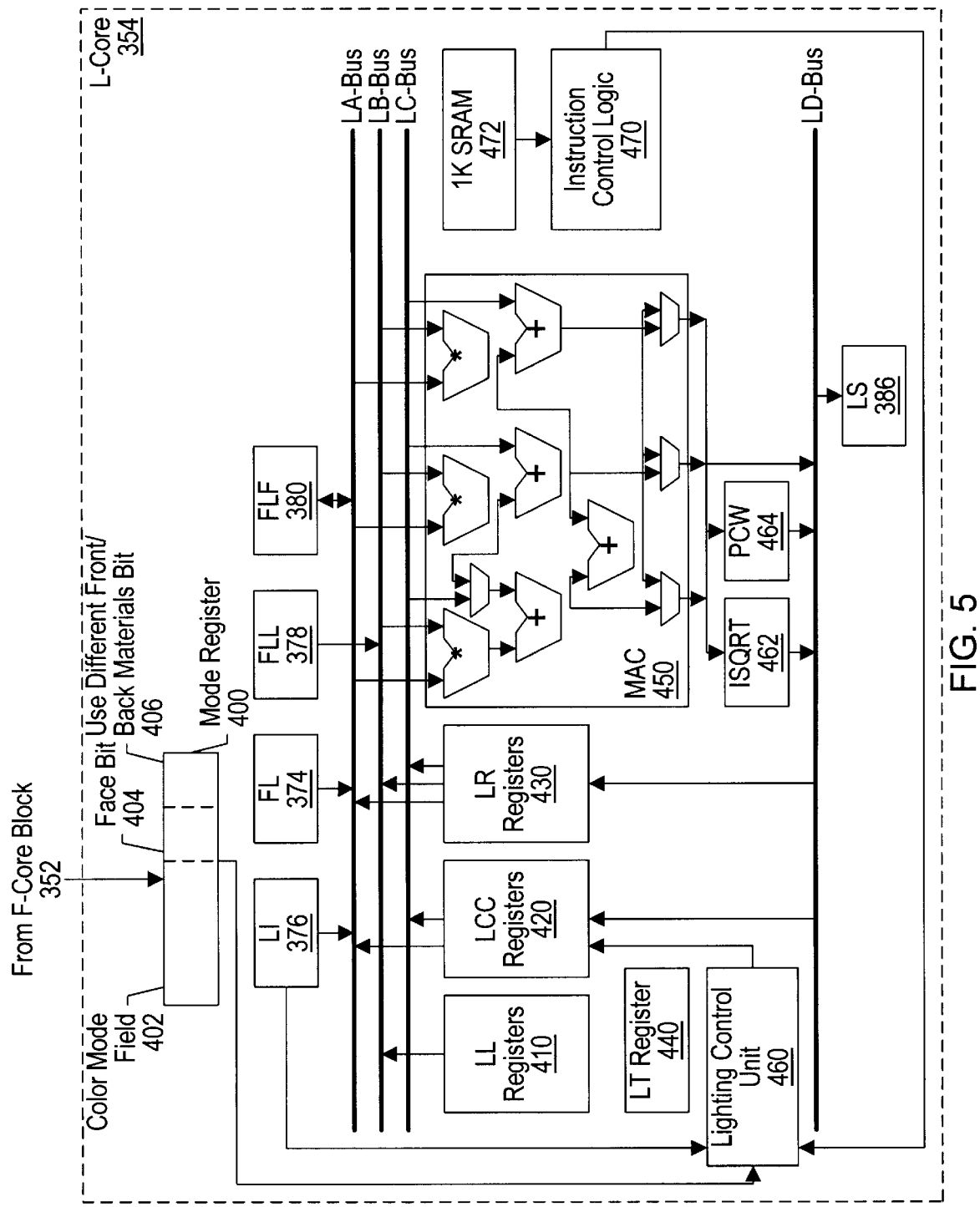
FIG. 5 is a block diagram illustrating the L-Core block in the preferred embodiment of the present invention.

FIG. 5—L-Core Block Diagram

Referring now to FIG. 5, a block diagram illustrating the L-Core block 354 in each of the floating point processors 152 is shown. The L-core block 354 comprises a fixed point computational unit for performing lighting computations. As depicted, L-core block 354 includes a mode register 400 which is coupled to receive input data from F-core block 352. Mode register 400 includes a color mode field 402, a face bit 404, and a "use different front/back materials" bit 406. The contents of mode register 400 are conveyed to a lighting control unit 460, which also receives data from LI buffer 376, as well as control signals from an instruction control logic block 470. Lighting control unit 460 is configured to convey color data from LI buffer 376 to an LCC register file 420.

Additional information is conveyed to L-core block 354 via FL buffer 374, FLL buffer 378, and FLF buffer 380. In addition to LCC register file 420, L-core block 354 includes an LL (light) register file 410, and a LR (general purpose) register file 430. Operands are conveyed from register files 410, 420, and 430 to an LA-bus, an LB-bus, and an LC-bus to a multiply-accumulate block 450 for lighting computations. These computations are performed under control of instruction control logic block 470, executing microcode stored in an SRAM 472. Additional lighting computations are performed in an inverse square root (ISQRT) block 462 and a power function unit 464. Lighting results are conveyed on an LD-bus, and conveyed to S-core block 356 via LS buffer 386.

The L-core processor 354 is designed specifically to perform lighting calculations. In the preferred embodiment, the L-core block 354 performs most of the lighting operations. The F-core block 352 performs lighting computations for more complex light sources which require the use of a general purpose floating point processor, such as point and spot light sources.

In the preferred embodiment, all calculations in L-core block 354 are performed using 16-bit fixed-point math, three at a time. The three values in a 48-bit word may either represent one triple such as XYZ, normal, or RGB, or may represent a value (e.g., an alpha value) for each three different vertices of a triangle. The lighting computation performed by L-core 354 does not use pre-multiplied material color with other lighting attribute's cached values. This allows the graphics accelerator to support RGB per-vertex color triangle meshes as a high quality alternative to texture and bump mapping. In general, most lighting operations are expected to include a per vertex color change. While this requires some increased computation in the L-Core 354, it is completely overlapped by other units (i.e., L-Core is still faster than both F-Core and S-Core). This change also makes it much easier to support OpenGL's semantics, in which colors might change at any vertex without warning and without any effective way of caching.

The L-Core 354 has efficient 16-bit function units and also performs the model space to world space transformation on vertex normals. The command block 142 delivers normal data to the floating point processor 152 as 48-bit values (3 16-bit components), already normalized. The L-Core registers include two 3×3 normal transformation matrices, stored as three 48-bit values each. The two transformation matrices are used to perform left and right eye transformations in stereo mode.

Colors and normals are transferred from the command block 142 to L-Core 354 by way of the LI-Buffer 376. The lighting calculations are performed in response to microcode instructions residing in SRAM 472 and executing under control of instruction control logic 470 and a dispatch word passed in from F-core block 352. The L-Core instruction set does not include branch instructions, so each step of the lighting calculation runs to completion, then the next step is started based on the contents of the next dispatch word.

The L-Core 354 includes three different register files in addition to the input and output buffers. The LL registers 410 contain the values for each of up to 32 lights. LT register 440 specifies which light to access, since only one light may be accessed at a time. The light values are loaded by F-Core 352 and are not modified by L-Core 354. The LR registers 430 are used as general purpose registers for storing intermediate values from the lighting computations. The LCC registers 420, loaded under control of lighting control unit 460, hold the material properties or "current color" values for primitive vertices, and are further discussed below.

L-Core block 354 includes multiply-accumulate block 450, including one unit for each of the three 16-bit values in the 48-bit word. Standard operation of each of the multiply-accumulate units is 48 bits in and 48 bits out. For the dot product calculation, there is only a 16-bit result, so this result is replicated into each of the three 16-bit fields.

Inverse square root (ISQRT) block 462 is used in normalizing the viewpoint vector. The ISQRT block 462 receives 16 bits from a dot product calculation and produces a 16-bit result, replicated to three values in the 48-bit word. Furthermore, the L-Core 354 also includes a power function unit 464 which is used for computing specular highlights. The power function unit 464 also takes in 16 bits from a dot product calculation and produces a 16-bit result, replicated to three values in the 48-bit word. The power function unit 464 performs two table lookups and performs other calculations to produce an accurate value. The result is accurate to 0.5%, or accurate to a least significant bit of an 8-bit color.

L-Core Communication Buffers

The L-Core 354 includes five different buffers for communicating with other parts of the chip. The LI Buffer 376 corresponds to the FI buffer 372 in F-Core block 352. The LI Buffer 376 is used for accessing incoming data from command block 142 coming across the CF-Bus. The LI Buffer 376 appears as seven 48-bit registers and contains three colors, three normals, and one word containing the three alpha values. Like the FS registers 384 in F-Core 352, the LI buffer 376 comprises five buffers to match up with the two FI Buffers 372, the two FL buffers 374, plus the one primitive that is being processed in F-Core 352.

The FL Buffer 374 is used to receive the XYZ viewpoint vector from F-Core 352. The FL Buffer 374 is also used to store clipped RGB color and alpha values when necessary. The FLL FIFO 378 is used for passing attenuation values for local lights. These values require floating-point computations that may only be performed in F-Core 352. When the lighting calculations get to the point where the attenuation factor is needed for a light, L-Core 354 pauses until the data is available in the FLL FIFO 378.

The FLF Buffer 380 is for communication between L-Core and F-Core and is not intended for normal operation. One run-time use of the FLF buffer 380 is to send lighting values back to L-Core 354 during clipping and for F-Core to "borrow" the power function logic from L-Core 354 for use with spot lights. To do this, F-Core writes the two power function parameters to the FLF buffer 380, then interrupts L-core and requests that the computation be performed. When computations are complete, the result is placed back into the FLF buffer 380 and L-Core 354 is allowed to continue. F-Core 352 then reads the result out of its side of the FLF buffer 380. The FLF buffer 380 is also used for diagnostic purposes.

The LS Buffer 386 comprises the write-only output registers used to send data to S-Core 356 for setup computations. Only colors and alpha values are sent across this interface. For standard triangles, three colors and one alpha word (containing three values) are sent to S-Core 356. In the preferred embodiment, the LS Buffer 386 comprises four double-buffered entries.

Figure 6:
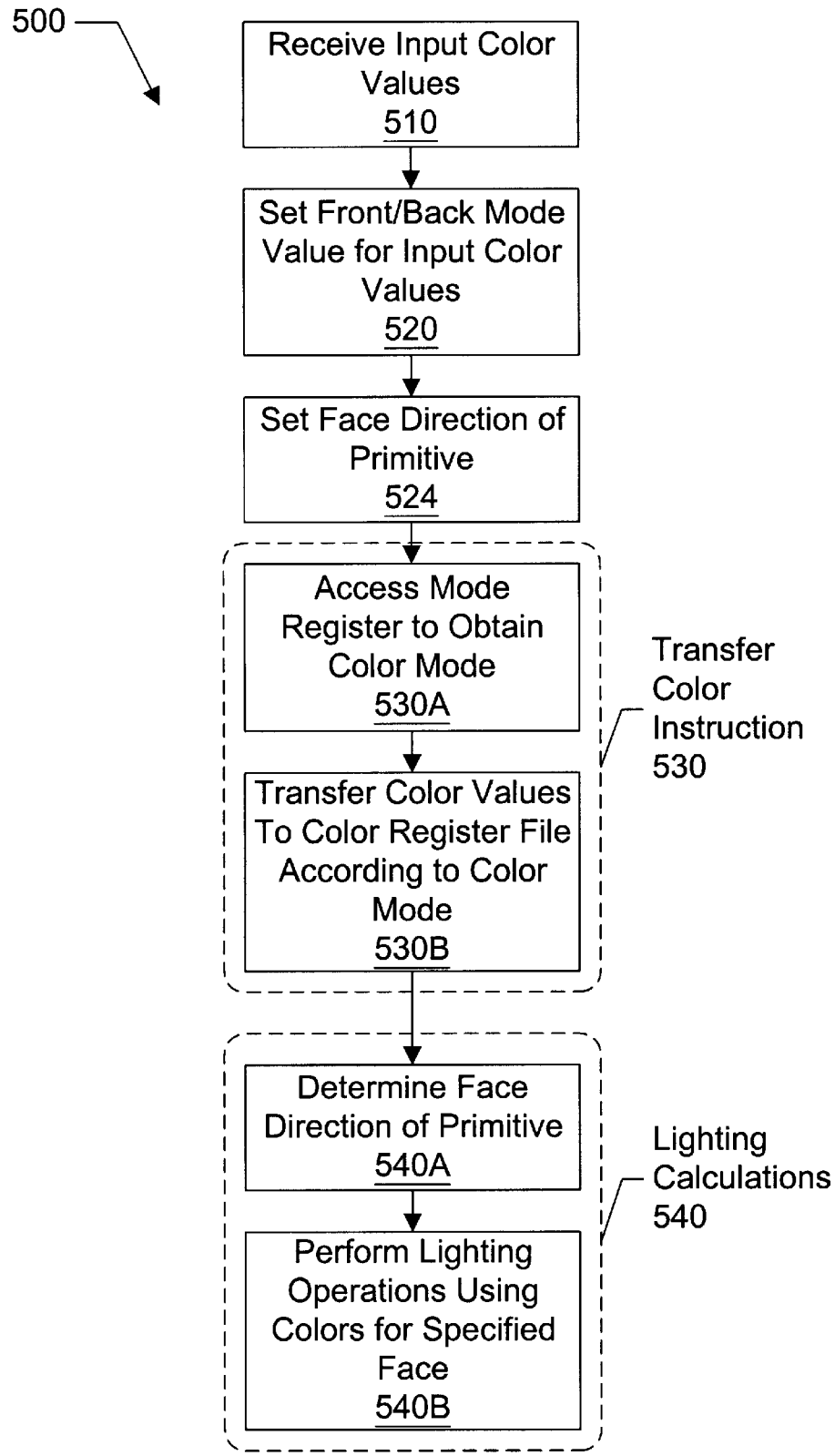
FIG. 6 is a flowchart illustrating one method of performing automatic selection of front/back material colors in one embodiment of the present invention.

FIG. 6—Handling of Incoming Color Values

Referring now to FIG. 6, a flowchart is shown depicting a method 500 for performing improved handling of incoming color values according to one embodiment of the present invention. Method 500 first includes a step 510, in which a plurality of color values are stored into LI buffer 376. Each entry in LI buffer 376 includes seven 48-bit entries. Three of these entries specify red-blue-green color components for each vertex of a triangle that is to be rendered by graphics accelerator 112. A fourth entry is used to store alpha values. The red-blue-green colors may correspond to either the front or back surface of the triangle, or both. Furthermore, these colors may be specified to be used for emission light calculations, ambient light calculations, diffuse light calculations, specular light calculations, or ambient/diffuse calculations, in keeping with the OpenGL standard.

In step 520, a value is written to mode register 400 by F-core block 352 indicating how the color values in LI buffer 376 map to the surfaces of an incoming triangle. As will be described below, the colors in LI buffer 376 are transferred to LCC registers 420 in accordance with this value. As shown in FIG. 5, mode register 400 includes a color mode field 402, a face bit 404, and a use different front/back materials bit 406. Color mode field 402 is used to determine whether the colors in LI buffer 376 are to be transferred to the portion of LCC register file 420 that contains front material colors, back material colors, or both. Additionally, mode field 402 may also indicate that the colors in LI buffer 376 are not to be transferred to register file 420 for a given triangle. In such a case, the triangle has no per-vertex color values, and may instead use a global color value specified for the front or back surface. In a different embodiment, a primitive that has no specified per-vertex colors may have a front/back color set in a previous stage of the graphics pipeline of accelerator 112. One possible mapping of color mode field 402 is shown in Table 1 below:

TABLE 1

| Color Mode | Definition | LCC Registers Starting Offset |
|---|---|---|
| 0000 | Do Nothing | 0000 |
| 0001 | Front ambient & diffuse color | 0011 |
| 0010 | Back ambient & diffuse color | 0011 |
| 0011 | Front & back, ambient & diffuse color | 0011 |
| 0100 | Front emission color | 0000 |
| 0101 | Front ambient color | 0011 |

TABLE 1-continued

| Color Mode | Definition | LCC Registers Starting Offset |
|---|---|---|
| 0110 | Front diffuse color | 0110 |
| 0111 | Front specular color | 1001 |
| 1000 | Back emission color | 0000 |
| 1001 | Back ambient color | 0011 |
| 1010 | Back diffuse color | 0110 |
| 1011 | Back specular color | 1001 |
| 1100 | Front and back emission color | 0000 |
| 1101 | Front and back ambient color | 0011 |
| 1110 | Front and back diffuse color | 0110 |
| 1111 | Front and back specular color | 1001 |

Thus, when color values for each vertex of a triangle in LI buffer 376 are to be transferred to LCC registers 420, control logic in F-core block 352 writes the appropriate color mode value to the color mode field 402 of mode register 400 in step 520.

In a step 524, F-core block 352 sets the "faced-ness" of the incoming triangle, as typical graphics standards allow primitives to be either front-facing or back-facing. In one embodiment, a face direction is encoded into face bit 404 and use different front/back materials bit 406. One possible encoding of the two bits is shown in Table 2:

TABLE 2

| Face Bit 404 | Use Different Front/Back Materials Bit 406 | Side Selected |
|---|---|---|
| 0 | 0 | Front |
| 0 | 1 | Front |
| 1 | 0 | Front |
| 1 | 1 | Back |

As shown above, a triangle is determined to be front-facing unless face bit 404 and use different front/back materials bit 406 are both set (in which case the triangle is designated to be back-facing). Bit 406 being cleared causes front color values to be used regardless of the face bit value 404 that is set for a particular triangle. Other means of encoding face direction are possible in other embodiments of L-core block 354.

With color mode and face direction set, L-core block 354 executes a transfer color command in a step 530. As shown in FIG. 6, step 530 comprises sub-steps 530A and 530B. In the preferred embodiment, the transfer color command is stored in SRAM 472 as microcode, and executed under control of instruction control logic 470. The transfer color command employs the value of color mode field 402 (accessed in sub-step 530A) to effectuate the transfer of color values from LI buffer 376 to LCC register file 420 in a sub-step 530B via a dedicated data path through lighting control unit 460.

Figure 7A:
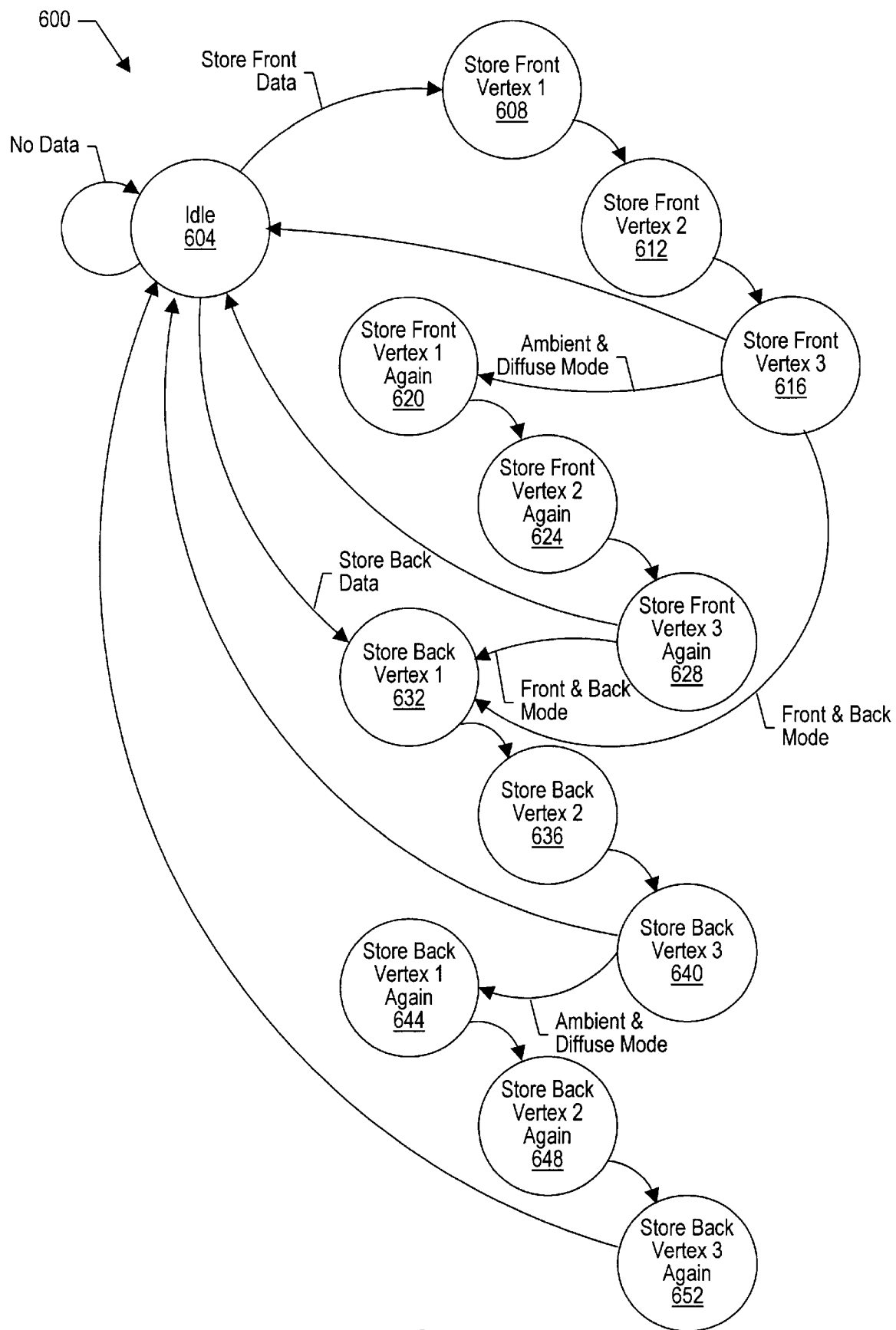
FIGS. 7A–B are state machine diagrams depicting operation of the transfer color instruction in two different embodiments of the present invention.
Figure 8A:
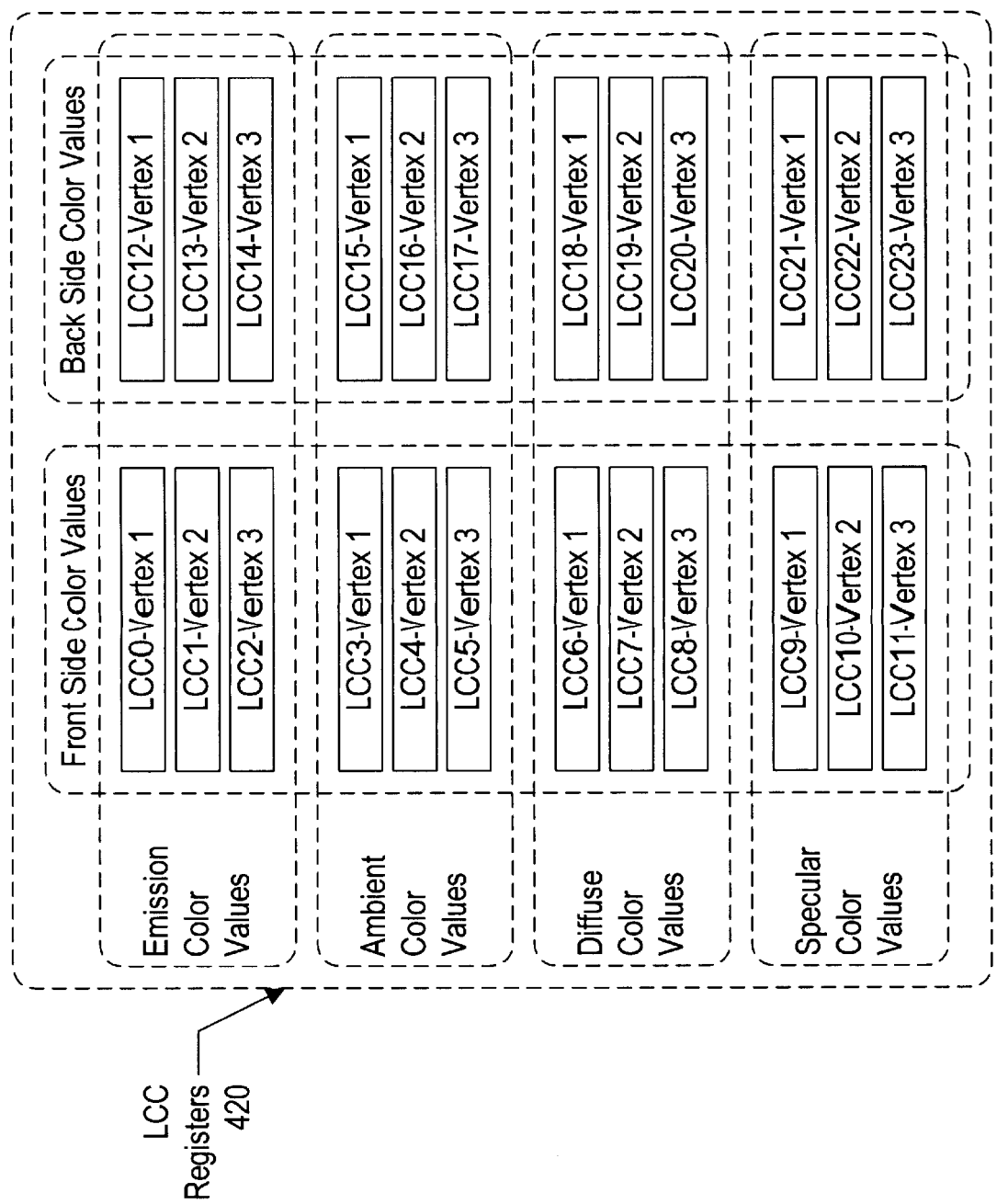
FIGS. 8A–B are block diagrams depicting the color value register file in two different embodiments of the present invention.

In one embodiment (as shown in FIGS. 7A and 8A), the transfer color command may store zero, three, six, or twelve LCC registers, depending on the value of color mode field 402. If color mode field 402 indicates no colors are to be transferred, the transfer color commands executes as a no-op, and no per-vertex colors are loaded into LCC register file 420. If color mode field 402 is set such that either the front or back surface is specified (but not both), three LCC registers are written starting at the offset specified in Table 1 unless the ambient and diffuse mode is selected. Each of the three 48-bit fields specifying red-blue-green color within the "bottom" entry in LI buffer 376 is written to a corresponding group of three LCC registers (as shown in FIG. 8).

If ambient and diffuse mode is enabled, the three 48-bit color value fields in LI buffer 376 are written to both the ambient and diffuse groups of registers. If color mode field 402 specifies that the colors in LI buffer 376 correspond to the front and back of a triangle, six LCC registers are written. For example, if the front and back diffuse mode is selected, LCC registers 6–8 are written for the front side, while registers 18–20 are written for the back side with the same values. Finally, if color mode field 402 specifies front and back, ambient and diffuse mode, twelve LCC registers (3–8,15–20) are written. Each group of three LCC registers that stores ambient or diffuse color values receives the contents of the three vertex color values in LI buffer 376. Step 530 is described in further detail with reference to FIG. 7A.

In a different embodiment of the present invention (shown in FIGS. 7B and 8B), LCC register file 421 is additionally configured to include alpha blending values for the front and back surfaces. The storing of the emission, ambient, diffuse, and specular colors operates similarly to the embodiment described above. Front and/or back alpha values are stored if diffuse lighting is selected.

In a step 540, lighting operations are performed by L-core block 354 using the color values transferred from LCC register file 420. In sub-step 540A, mode register 400 is accessed to determine the face direction of the current primitive. As described above, the face direction value is encoded by face bit 404 and use different front/back materials bit 406 in one embodiment.

In sub-step 540B, the lighting operations are performed for the input triangle, using the color values for the surface specified by the face direction set in mode register 400. In one embodiment, only a portion of the values in LCC register file 420 are available to the lighting computation unit during a given cycle. In this embodiment, the face direction of the input triangle determines which half of registers 420 are addressable. For example, if a triangle is specified as being back-facing, the values in the upper half of LCC register file 420 are used as input color values for effecting lighting calculations.

Because the color mode field 402 (which governs the transfer color instruction) is typically set before an input triangle is received by L-core block 354, the color values stored by the transfer color instruction may not actually be used in performing the lighting calculations. For example, presume that color mode field 402 is set to indicate that the color values in LI buffer 376 correspond to front side properties. The color values (and, possibly, alpha value) are then transferred to a portion of LCC register file 420 which stores front side color properties. When the input triangle is received, however, bits 404 and 406 may specify a back-facing direction. The front side properties transferred are thus not used for the current lighting calculation. While this decoupling of the transfer color command from determination of face direction may cause some unneeded transfers to registers 420, overall the implementation leads to more efficient handling of incoming color values.

Since the transfer color instruction includes a reference to mode register 400 (which determines the destination offset in LCC register file 420), one microcode routine may be used for all variations of incoming color properties. Storage in SRAM 472 is therefore saved, and performance is advantageously increased since the control hardware does not have to be optimized for many different transfer routines.

It is noted that in one embodiment, a number of LR registers 430 may also be dedicated to either front or back properties. For example, in the XGL API, a specular exponent and ambient, diffuse, and specular colors may be specified for both the front and back sides of a polygon. Four LR registers 430 may be dedicated to storing these front side properties during lighting calculations, with another four registers being dedicated to storing the corresponding back side properties. As with LCC register file 420, these front and back groups of registers may be automatically selected according to values of face bit 404 and use different front/back materials bit 406.

Figure 7B:
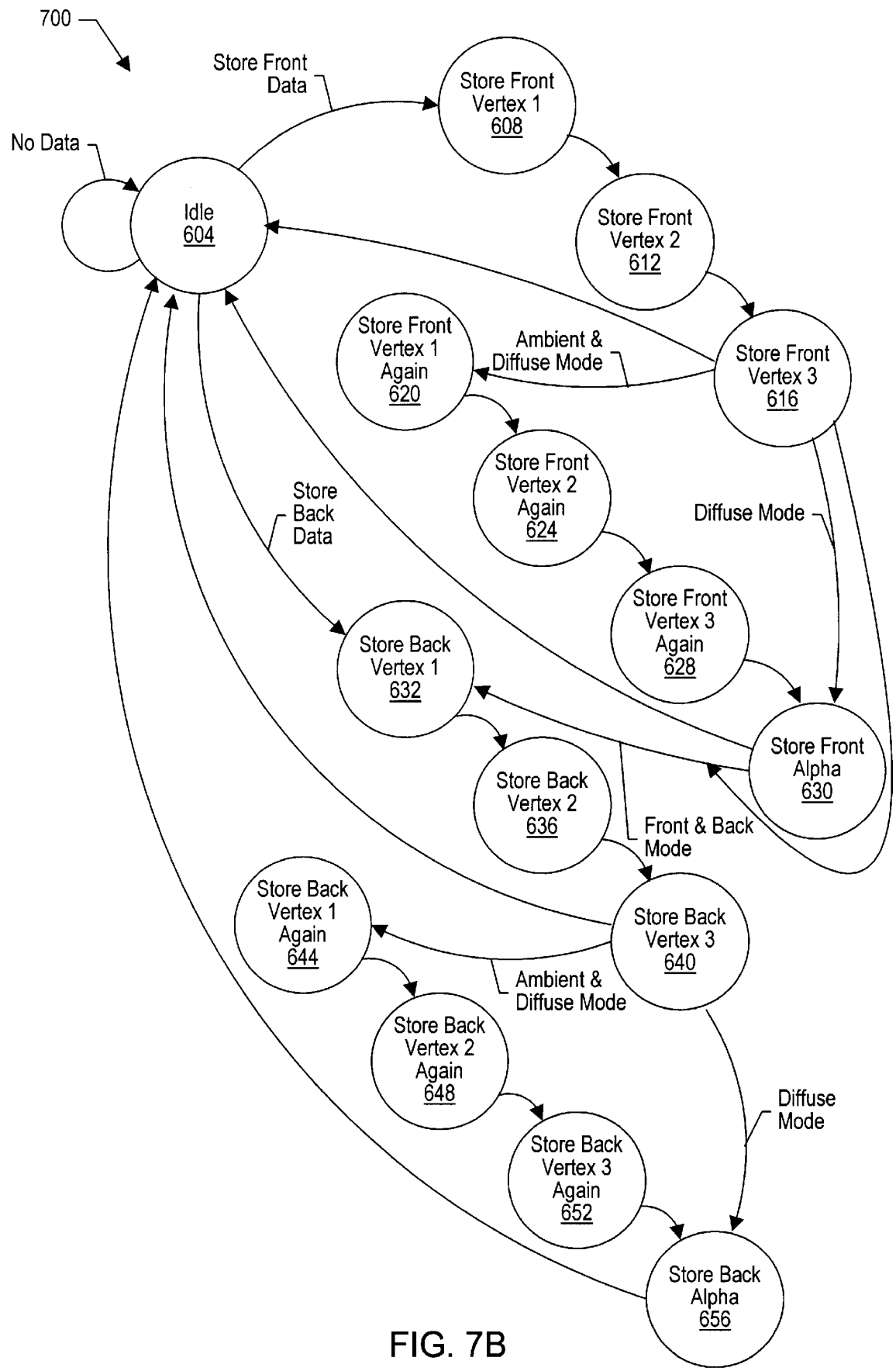

FIGS. 7A and 7B—Transfer Color Command

Referring now to FIG. 7, a state machine 600 is shown depicting operation of one embodiment of the transfer color command executed in step 530 of method 500. State machine 600 transitions between various states in response to receiving a clock signal and appropriate input signals. Control logic in L-core block 354 remains in idle state 604 until the transfer color command is encountered. In response to the value of color mode field 402, state machine 600 transitions to either state 608 (store front or front/back) or state 632 (store back). The front or back portion of LCC register file 420 is also selected in accordance with color mode field 402.

If color mode field 402 specifies a front color mode, L-core block 354 stores color values from LI buffer 376 for vertices 1, 2, and 3 in states 608, 612, and 616. In state 616, if the color mode field 402 indicates an ambient/diffuse mode, state machine 600 enters state 620, storing diffuse color values for the three vertices in states 620, 624, and 628. The state machine then returns to idle state 604.

If field 402 specifies a front/back color mode, state machine 600 transitions through states 608, 612, and 616. In state 616, if color mode field 402 indicates ambient/diffuse mode, diffuse color values are stored for each vertex in states 620, 624, and 628. Because front/back mode is specified, state machine 600 then enters states 632, 636, and 640, storing back side color values. State machine 600 transitions directly from state 616 to states 632, 636, and 640 if ambient/diffuse mode is not specified. From state 640, state machine 600 enters state 604 or 644 depending on whether ambient/diffuse mode is indicated. Once in state 644, back side diffuse color values are stored for each vertex in states 644, 648, and 652. From state 652, state machine 600 re-enters idle state 604.

If color mode field 402 specifies a back color mode, state machine 600 enters states 632, 636, and 640 successively, storing back side color values for vertices 1, 2, and 3. From state 640, state machine 600 transitions to idle state 604 unless ambient/diffuse mode is specified. In this case, state machine 600 cycles through states 644, 648, and 652, storing back side diffuse color values. From state 652, state machine 600 re-enters idle state 604.

Referring now to FIG. 7B, a state machine 700 is shown depicting operation of the transfer color command in an alternate embodiment of the present invention in which alpha values are supported for both the front and back surfaces. State machine 700 operates similarly to state machine 600, with the addition of states 630 and 656. State machine 700 also includes another transition from state 616. As shown, if diffuse mode is specified, state machine 700 transitions from state 616 to state 630, in which the front side alpha component is stored. From state 630, operation proceeds to either idle state 604 or state 632, depending on whether front/back mode is specified. Similarly, state 640 in state machine 700 also includes a new transition. In state 640, if diffuse mode is set, state machine 700 enters state 656, in which the back side alpha value is stored to LCC register file 421. From state 656, state machine 700 returns to idle state 604 in preparation for the next transfer color command.

Figure 8B:
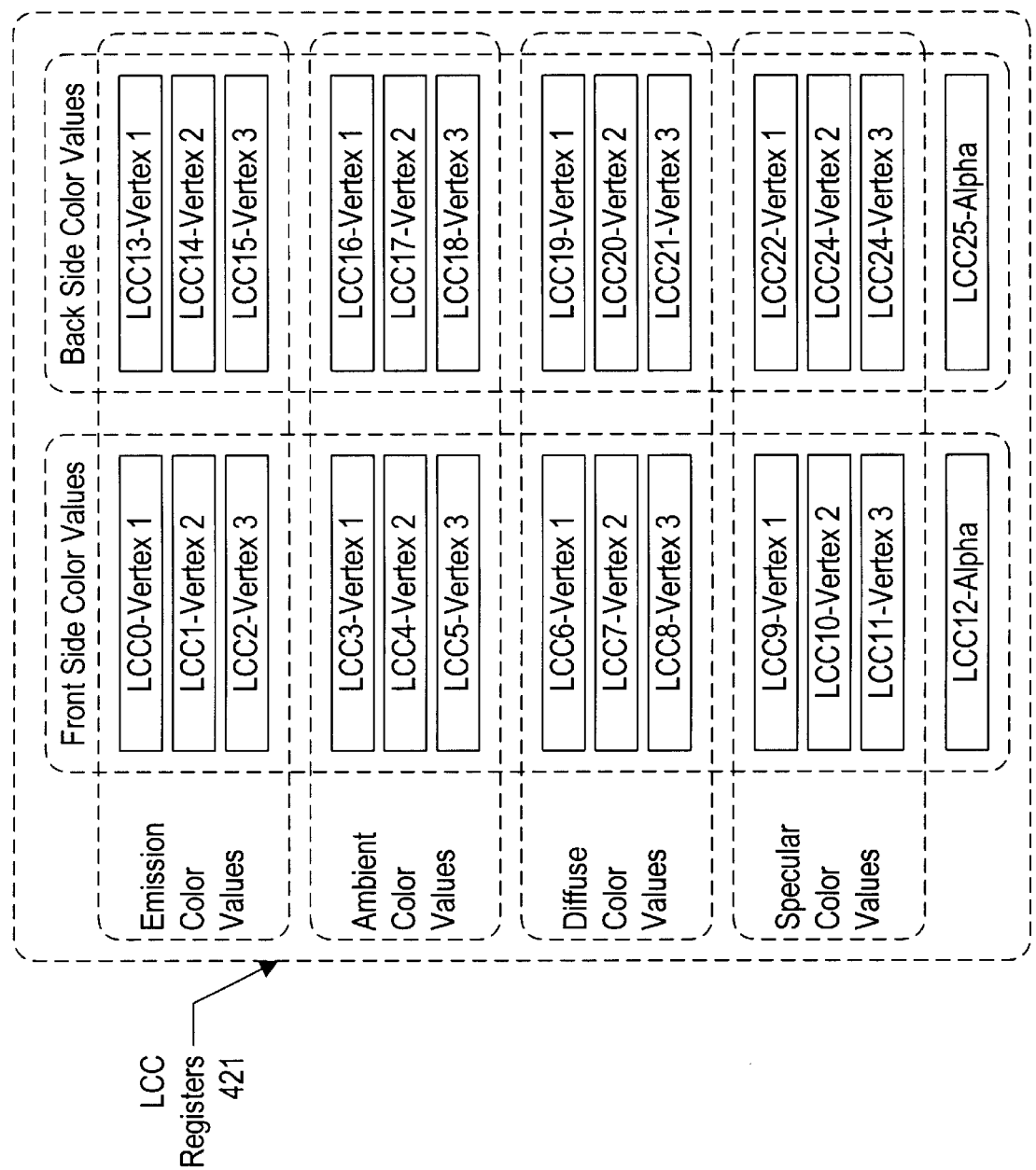

FIGS. 8A and 8B—LCC Register File

Referring to FIG. 8A, one embodiment of a color register file, LCC register file 420, is shown. As depicted, LCC register file 420 is organized into two sets of registers: LCC0–LCC11 (front) and LCC12–LCC23 (back). Each set of registers is divided into four groups of three registers. The four groups correspond to the lighting modes supported in the OpenGL standard: emission, ambient, diffuse, and specular. The three registers within each group correspond to the color values at each of the three vertices of the triangle being processed. As described above, color values are stored into LCC register file 420 by the transfer color command as specified by the value of color mode field 402 in mode register 400. Registers 420 are then accessed by lighting unit hardware s in accordance with the face direction of the input triangle (as determined by bits 404 and 406). Support of different vertex colors for a triangle and different colors for each lighting mode on a per-vertex basis allows more sophisticated lighting to be performed, resulting in greater visual realism.

Referring to FIG. 8B, a different embodiment of the color register file, LCC registers 421, is shown. As depicted, LCC register file 421 is organized similarly to LCC register file 420, with the addition of a register for a front-side alpha value (LCC 12) and for a back-side alpha value (LCC25). Register file 421 is organized into a front half and a back half, with each half divided into four groups of three registers plus the alpha value register. The addition of the alpha component in this embodiment allows for an even more realistic representation of an object through transparency lighting calculations.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing lighting operations on a polygon, comprising:

receiving a plurality of input color values corresponding to said polygon;

receiving a color mode value;

transferring said plurality of input color values into a color value register file according to said color mode value, wherein said color mode value is indicative of one or more locations within said color value register file where said plurality of input color values are to be stored; and generating output color values for said polygon utilizing one or more of said plurality of input color values stored in said color value register file.

2. The method of claim 1, wherein said color mode value is indicative of whether said plurality of input color values correspond to a front side of said polygon, a back side of said polygon, or both sides of said polygon.

3. The method of claim 1, wherein said color value register file includes a first plurality of storage locations for storing color values of a front side of said polygon and a second plurality of storage locations for storing color values of a back side of said polygon.

4. The method of claim 1, wherein said color mode value is indicative of one of a plurality of lighting modes for performing said lighting operations.

5. The method of claim 4, wherein said plurality of lighting modes are selected from the group consisting of: (i)

emission mode, (ii) ambient mode, (iii) diffuse mode, (iv) specular mode, and (v) ambient/diffuse mode.

6. The method of claim 4, wherein said color value register file includes a plurality of storage locations for each of said plurality of lighting modes.

7. The method of claim 1, wherein each of said plurality of input color values corresponds to one of a plurality of vertices of said polygon.

8. The method of claim 1, wherein each of said plurality of input color values includes one or more component color values.

9. The method of claim 1, further comprising storing said color mode value in a mode register.

10. The method of claim 9, wherein said transferring includes performing a sequence of program instructions, wherein said sequence of program instructions are executable to access said color mode value within said mode register to determine where to store said plurality of color input values within said color value register file.

11. The method of claim 1, further comprising storing a face mode value in a mode register, wherein said face mode value is indicative of how said plurality of color input values are to be utilized in said generating said output color values.

12. The method of claim 11, wherein said generating said output color values includes accessing said face mode value in said mode register in order to determine if said plurality of color input values are associated with a front side of said polygon, a back side of said polygon, or both sides of said polygon.

13. The method of claim 1, wherein said polygon is included in a plurality of polygons which represent a 3-D graphical object.

14. A graphics accelerator for performing lighting operations on a polygon, comprising:
   a lighting unit, including:
   an input buffer coupled to receive a plurality of input color values;
   a mode register coupled to receive a color mode value;
   a color value register file coupled to said input buffer, wherein said color value register file is configured to store color information;
   a transfer unit coupled to said input buffer and said mode register, wherein said control unit is configured to access said color mode value from said mode register, and wherein said control unit is configured to transfer said plurality of input color values into said color value register file according to said color mode value, wherein said color mode value is indicative of one or more locations within said color value register file where said plurality of input color values are to be stored;
   and wherein said lighting unit is configured to perform lighting calculations on said polygon by utilizing one or more of said plurality of input color values stored in said color value register file.

15. The graphics accelerator of claim 14, wherein said color mode value is indicative of whether said plurality of input color values correspond to a front side of said polygon, a back side of said polygon, or both sides of said polygon.

16. The graphics accelerator of claim 14, wherein said color value register file includes a first plurality of storage locations for storing color values of a front side of said polygon and a second plurality of storage locations for storing color values of a back side of said polygon.

17. The graphics accelerator of claim 14, wherein said color mode value is indicative of one of a plurality of lighting modes for performing said lighting operations.

18. The graphics accelerator of claim 17, wherein said plurality of lighting modes are selected from the group consisting of: (i) emission mode, (ii) ambient mode, (iii) diffuse mode, (iv) specular mode, and (v) ambient/diffuse mode.

19. The graphics accelerator of claim 17, wherein said color value register file includes a plurality of storage locations for each of said plurality of lighting modes.

20. The graphics accelerator of claim 14, wherein each of said plurality of input color values corresponds to one of a plurality of vertices of said polygon.

21. The graphics accelerator of claim 14, wherein each of said plurality of input color values includes one or more component color values.

22. The graphics accelerator of claim 14, wherein said transferring includes performing a sequence of program instructions, wherein said sequence of program instructions are executable to store said plurality of color input values within said color value register file according to locations specified by said color mode value.

23. The graphics accelerator of claim 14, further comprising storing a face mode value in said mode register, wherein said face mode value is indicative of how said plurality of color input values are to be utilized in said generating said output color values.

24. The graphics accelerator of claim 23, wherein said lighting unit is configured to access said face mode value in said mode register in order to determine if said plurality of color input values are associated with a front side of said polygon, a back side of said polygon, or both sides of said polygon.

25. The graphics accelerator of claim 14, wherein said polygon is included in a plurality of polygons which represent a 3-D graphical object.

26. A graphics sub-system configured to perform lighting operations on a polygon, comprising:
   a color value receiving means for receiving a plurality of input color values corresponding to said polygon;
   a color mode receiving means for receiving a color mode value;
   a color value storage means;
   a transferring means for transferring said plurality of input color values into said color value storage means, wherein said plurality of input color values are stored into said color value storage means according to said color mode value, wherein said color mode value is indicative of one or more locations within said color value storage means where said plurality of input color values are to be stored; and
   a color output generation means for generating output color values for said polygon utilizing one or more of said plurality of input color values stored in said color value storage means.

* * * * *